(12) United States Patent
Papanyan et al.

(10) Patent No.: US 7,765,196 B2
(45) Date of Patent: Jul. 27, 2010

(54) METHOD AND APPARATUS FOR WEB CACHE USING DATABASE TRIGGERS

(75) Inventors: Khachatur Papanyan, Austin, TX (US); Ken Maranian, Austin, TX (US); Hang H. Ng, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1732 days.

(21) Appl. No.: 10/601,353

(22) Filed: Jun. 23, 2003

(65) Prior Publication Data

US 2004/0267712 A1 Dec. 30, 2004

(51) Int. Cl.
*G06F 17/30* (2006.01)

(52) U.S. Cl. .................. 707/702; 707/615; 707/687; 707/689; 709/227

(58) Field of Classification Search .............. 707/2, 707/10, 104.1, 100, 1, 3, 201; 709/203, 213, 709/216; 395/200, 200.43
See application file for complete search history.

(56) References Cited

U.S. PATENT DOCUMENTS

| | | | |
|---|---|---|---|
| 5,864,854 A | 1/1999 | Boyle | 707/10 |
| 5,878,218 A * | 3/1999 | Maddalozzo et al. | 709/213 |
| 6,026,474 A * | 2/2000 | Carter et al. | 711/202 |
| 6,085,226 A | 7/2000 | Horvitz | 709/203 |
| 6,185,608 B1 * | 2/2001 | Hon et al. | 709/216 |
| 6,192,398 B1 * | 2/2001 | Hunt | 709/213 |
| 6,219,676 B1 | 4/2001 | Reiner | 707/201 |
| 6,324,565 B1 * | 11/2001 | Holt, III | 709/203 |
| 6,490,615 B1 | 12/2002 | Dias et al. | 709/219 |
| 6,510,458 B1 | 1/2003 | Berstis et al. | 709/219 |
| 6,526,479 B2 | 2/2003 | Rosenzweig | 711/133 |
| 6,557,054 B2 | 4/2003 | Reisman | 710/33 |
| 6,591,266 B1 | 7/2003 | Li et al. | 707/10 |
| 6,601,090 B1 * | 7/2003 | Gurijala et al. | 709/213 |

(Continued)

*Primary Examiner*—Tim T. Vo
*Assistant Examiner*—Dangelino N Gortayo
(74) *Attorney, Agent, or Firm*—Hamilton & Terrile, LLP; Gary W. Hamilton

(57) ABSTRACT

A method and apparatus for providing web pages to a client with improved speed and efficiency. Web pages are cached in a web server and are referenced from a database in a database server. When a request from a client is sent to the web server for a web page, the web server checks the web page cache table in the database server. The web page cache table contains a field wherein a flag is set to indicate whether any data that affects the web page has been updated. Database triggers are used to change the value of the flag when specified data fields corresponding to a web page have been changed. If the value of the flag indicates that there has not been any change in the data, the web server reads the html file reference in the web page cache table, retrieves the corresponding page from the web page cache in the web server and sends the page back to the client. If the value of the flag indicates that the data has changed, the web server reconstructs the web page from the database, caches the web page and resets the value of the flag before sending the web page to the client. The method and apparatus of the present invention is capable of delivering cached web pages in a much shorter time than is needed to generate the web page each time a request is received from a client.

12 Claims, 4 Drawing Sheets

U.S. PATENT DOCUMENTS

| | | | |
|---|---|---|---|
| 6,754,699 B2 * | 6/2004 | Swildens et al. | 709/217 |
| 6,754,800 B2 * | 6/2004 | Wong et al. | 711/216 |
| 6,925,485 B1 * | 8/2005 | Wang et al. | 709/202 |
| 6,990,526 B1 * | 1/2006 | Zhu | 709/227 |
| 2002/0116583 A1 | 8/2002 | Copeland et al. | 711/133 |
| 2003/0078964 A1 * | 4/2003 | Parrella et al. | 709/203 |

* cited by examiner

METHOD AND APPARATUS FOR WEB CACHE USING DATABASE TRIGGERS

BACKGROUND OF THE INVENTION

1. Field of the Invention

The present invention relates generally to database systems and, more particularly, to a method and apparatus for efficiently transferring web pages to a client through the use of database triggers.

2. Description of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One use of information handling systems is in the field of database management to support the storage and retrieval of information. In recent years there has been a considerable advancement in the use of database management systems to support transactions and distribution of information over the Internet.

One of the major shortcomings of web-based database applications is processing speed. Once the client requests a particular page of the web application, the web server starts constructing the web page by sending queries to the database server. The database server executes those queries and returns the dataset back to the web server and, finally, the web server draws the web page with the received data. The bottleneck usually lies with the database queries. For example, in many web applications, a single report page may use hundreds of different tables, and hundreds of queries to retrieve the necessary data from the database to draw a web page. Even powerful database servers require several seconds to draw the page per the client's request.

To minimize the processing time on the database server, various methods exist, such as caching the execution plans of the queries, minimizing tables, and using global ID schemas. These methods reduce the execution time on the database server, but they still require time consuming execution of the queries.

SUMMARY OF THE INVENTION

The present invention overcomes the shortcomings of the prior art by providing a method and apparatus to check, access, and update a web page cache through the use of database triggers, thereby significantly reducing the amount of time needed to deliver web pages to a client.

In the present invention, web pages are cached in a web page cache on a web server and are referenced from a web page cache table on a database server. When a request from a client is sent to the web server for a web page, the web server checks the web cache table on the database server. The web cache table contains a field that is referred to as a "dirty flag." When any data from the database that affects the web page is updated, the dirty flag is set. If the dirty flag is not set, the web server reads the html file reference in the web page cache table, retrieves the corresponding web page from the web page cache in the web server and sends the web page back to the client. If the dirty flag is set, it means that the page is already "dirty." In this case, the web server reconstructs the web page using data received from the database server, caches the web page and clears the dirty flag before sending the web page to the client.

The method and apparatus of the present invention is capable of delivering cached web pages in a much shorter time than is needed to generate the web page each time a request is received from a client. The present invention is particularly effective for web pages which require complex queries to retrieve the data.

The method and apparatus of the present invention can be implemented easily on existing systems to provide an effective increase in the performance of any web application.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
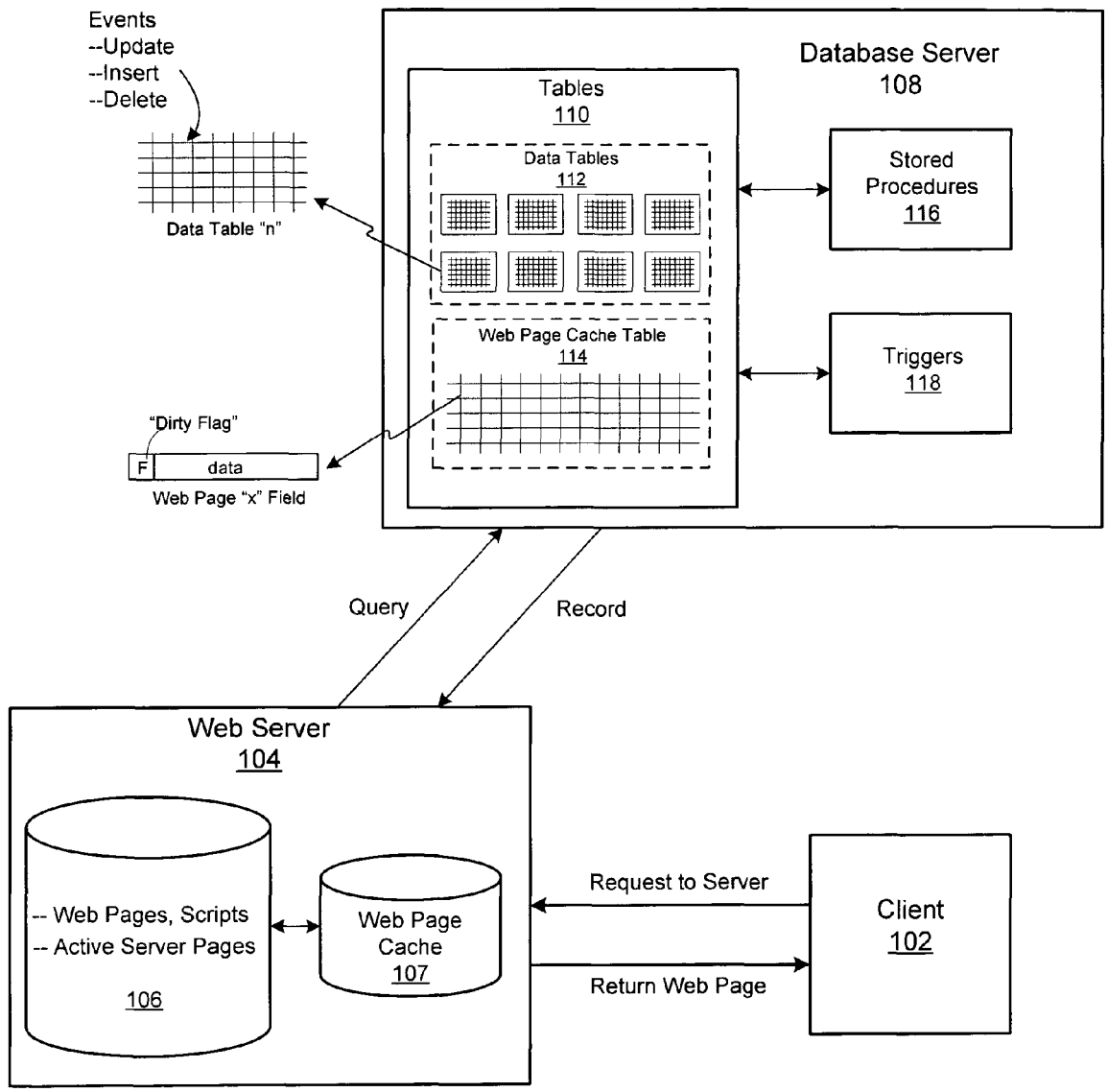
FIG. 1 shows a system block diagram of a system for transferring web pages to a client in accordance with the present invention.

FIG. 1 is an illustration of a system for using web page caching to deliver web pages to a client in an efficient manner. When client 102 requests a web page from web server 104, an active web page can be retrieved from the web server 104, cached in the web page cache 107 and then immediately returned to the client 102 if it can be verified that the version of the web page in the web page storage 106 is based on the most recent data. In the method and apparatus of the present invention, a web cache table can be used to confirm whether the version of the web page cached in the web server 104 is based on the most recent data.

A database server 108 comprises a plurality of tables 110 which include data tables 112 and a web page cache table 114. Data contained in the tables 110 can be modified by the database server in accordance with processing steps implemented by stored procedures 116 or triggers 118. In a database, a trigger is a set of Structured Query Language (SQL) statements that automatically "fires off" an action when a specific operation, such as changing data in a table, occurs. In the method and apparatus of the present invention, a trigger consists of an event (such as an INSERT, DELETE, or UPDATE statement issued against an associated table) and an action (the related procedure). Triggers are used to preserve data integrity by checking on or changing data in a consistent manner. The trigger is activated whenever a record is written to, or deleted from, the specific file.

The database trigger is a program written in the native programming language of an underlying database. This program, often in the form of a subroutine, is linked to a specific file within the database by making an entry into a data dictionary associated with the target file. Once this entry has been made, the system will automatically reference the database trigger whenever the file is referenced from any source.

As will be understood by those of skill in the art, one of the major shortcomings of web-based database applications is processing speed. Once the client 102 requests a particular page of a web application, the web server 104 starts constructing the web page by sending queries to the database server 108. The database server 108 executes those queries and returns the dataset back to the web server 104, and finally the web server 104 draws the web page with the received data. The bottleneck usually lies with the database queries.

One way to avoid query executions on the database server 108 is to cache the previously constructed web pages in the web page cache 107 on the web server 104 and re-use them next time they are requested. This way, after the first request, the time to draw a web page is only dependent on the access time to the web page cache 107 on the web server 104. In many systems, the appropriate stored web page can be delivered to the client 102 in a matter of milliseconds compared to several seconds required to generate a new web page in response to every query. In the method and apparatus of the present invention, the determination of whether a previously drawn web page can be re-used is based on an examination of a specific flag in the data fields contained in the web page cache table 114 in the database server 108, as will be discussed in greater detail below.

The web page cache table 114 contains a plurality of data fields that correspond to specific web pages, such as web page "x" illustrated in FIG. 1. In the system of the present invention, a flag, referred to as a "dirty flag," is used to provide an indication of whether the data corresponding to the web page has been modified since the last time the web page was requested by the web server. When the web server 104 sends a query to the database server requesting information on a specific web page, the database server 108 processes the query to determine if the dirty flag "F" has been activated, thereby indicating that the data corresponding to the web page has changed. If the dirty flag "F" has not been set, the record returned by the database server to the web server 104 indicates that the web server can transmit a previously stored version of the web page directly to the client 102 without the need to reconstruct the html web page. If, on the other hand, the database server indicates that the web page has changed since the last request, the appropriate data from the data tables 112 are sent to the web server 104 and the corresponding web page is constructed by the web server 104, cached in the web page cache 107 on the web server 104 and sent to the client 102. After the new web page has been generated, the database server resets the dirty flag "F" to indicate that the version of the web page stored on the web server 104 is the most current version.

Specific fields in the data tables 112 can be used to cause the trigger 118 to set the dirty flag "F" in the various web page data fields in the web cache table 114. As illustrated with respect to data table "N" in FIG. 1, changes such as an update to a data field, an insert to the data field, or the deletion of a data field are events that can cause the triggers 118 to modify the web page fields in the web page cache table 114.

Figure 2:
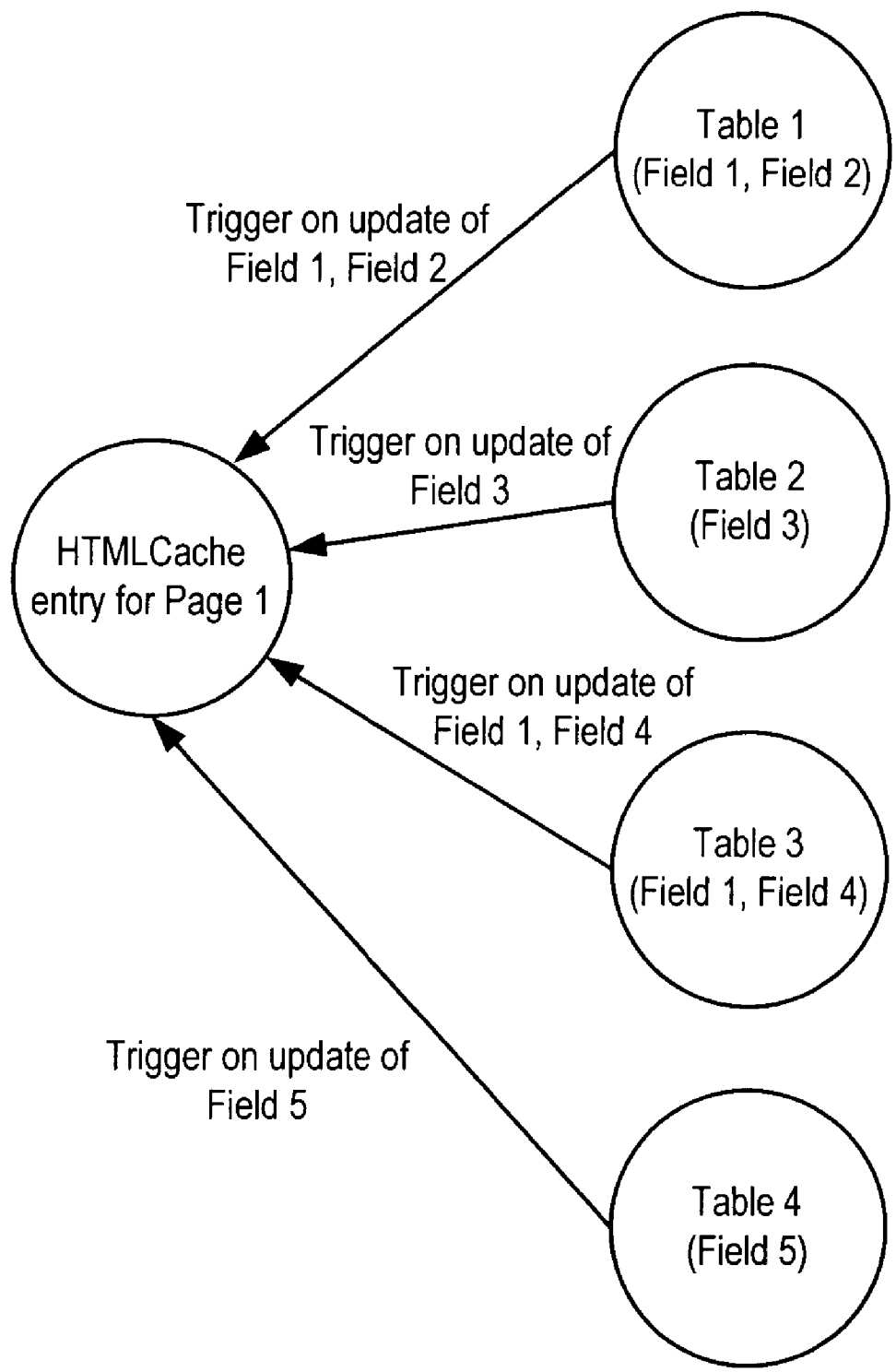
FIG. 2 is an illustration of triggers activated by updates of specific fields in a database table.

As will be understood by those of skill in the art, determining when the page is "dirty" is critical to the caching scheme of the present invention. From the database queries used to generate the web page, it is possible to identify the fields/tables in the database which directly affect the cached page. In order to know when to refresh the cache, the database triggers will be setup on those fields/tables. The triggers update the dirty flag in the web page cache table 114 in case of any modifications. Referring to FIG. 2, for example, triggers are added to Field 1 and Field 2 in Table 1 on an update. Suppose Field 1 is now updated in the database, the database trigger is executed and it sets the dirty bit for the page in web page cache table 114. Multiple triggers may set the dirty flag repeatedly. When the web page is referenced, the web server 104 inspects the data field corresponding to the requested page and finds the dirty flag "F" bit is set. In this case, the data is retrieved from the database once again and the cached page is regenerated. If none of the fields have been modified, then no trigger has been executed, and the dirty flag "F" is clear for that cached page, thus the web server 104 sends the cached page to the client in a matter of milliseconds.

As illustrated in FIG. 2, various combinations of fields in the different tables can be used to trigger an update of the web page field in the web cache table 114. For example, Table 1 may have two operable fields, Field 1 and Field 2, while Table 2 may have only a single field that triggers an update as illustrated by the trigger generated by a change in Field 3. Likewise, Table 3 may have two fields that trigger an update, as illustrated by Field 1 and Field 4, while Table 4 may have a single field that triggers an update as illustrated by Field 5.

Figure 3:
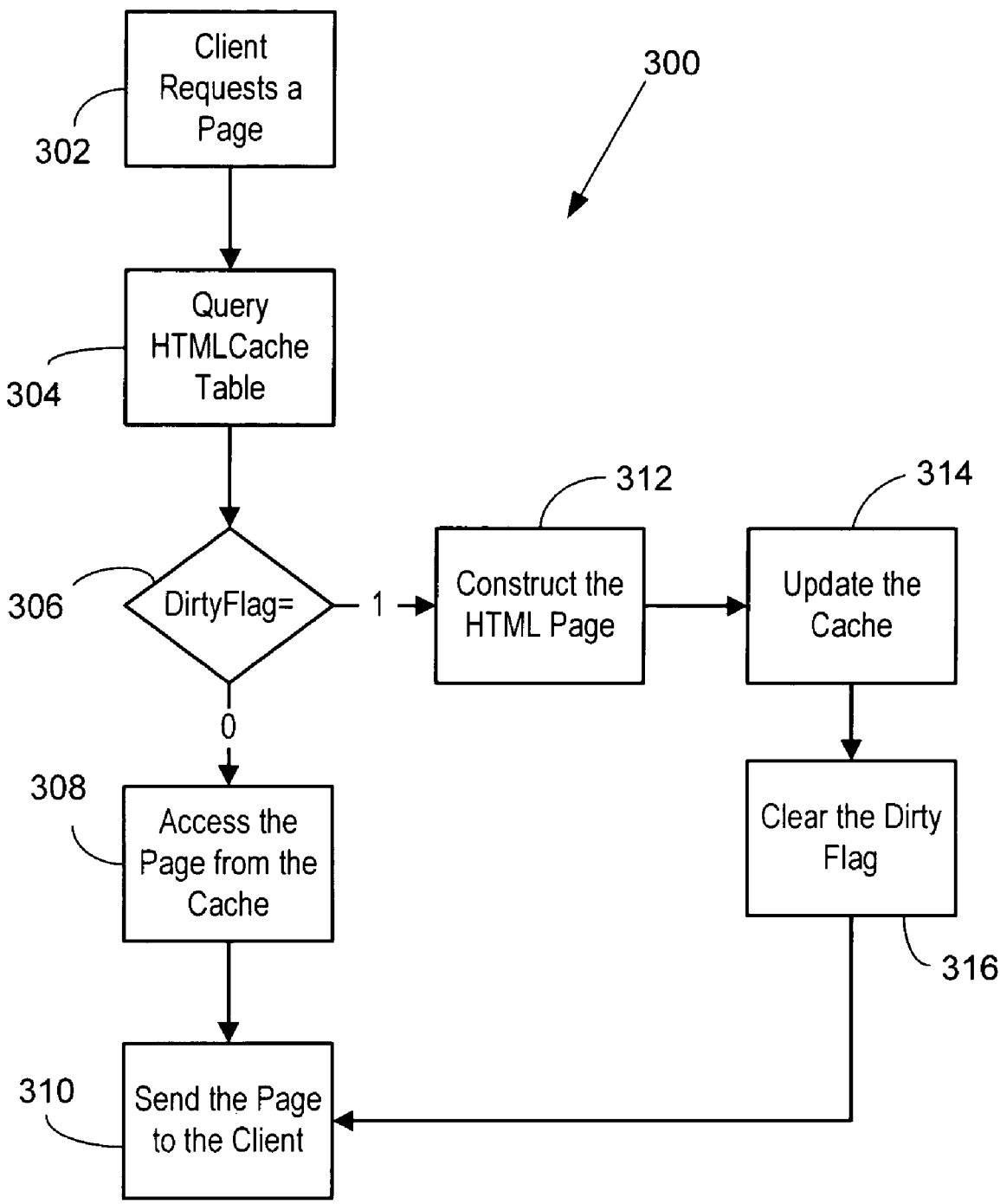
FIG. 3 is a flow chart illustration of the processing steps implemented in the present invention for efficiently delivering web pages to a client.

FIG. 3 is a flow chart illustration of the processing steps used to implement the method of the present invention. In step 302, client 102 requests a web page. In step 304 the query is sent to the database server 108 and the query is processed to examine the data in the html cache table 114. In step 306, a test is conducted to determine whether the dirty flag "F" has been set in the corresponding field in the web page cache table 114 in the database server 108. If the result of the test in step 306 indicates that the dirty flag has not been set, the web page is accessed from the web page cache 107 in step 308 and the web page is sent to the client in step 310. If, however, the result of the test conducted in step 306 indicates that the dirty flag "F" has been set, the web page is constructed in step 312 and the appropriate data field in the web cache table is updated in step 314. In step 316 the dirty flag "F" is cleared and the web page is cached in the webpage cache 107 and is sent to the client in step 310.

An area in which databases are useful is in the manufacture and sale of information handling systems. Because information handling systems include many parts which are often changing, many database calls may be involved in the development and manufacture and sale of an information handling system.

Figure 4:
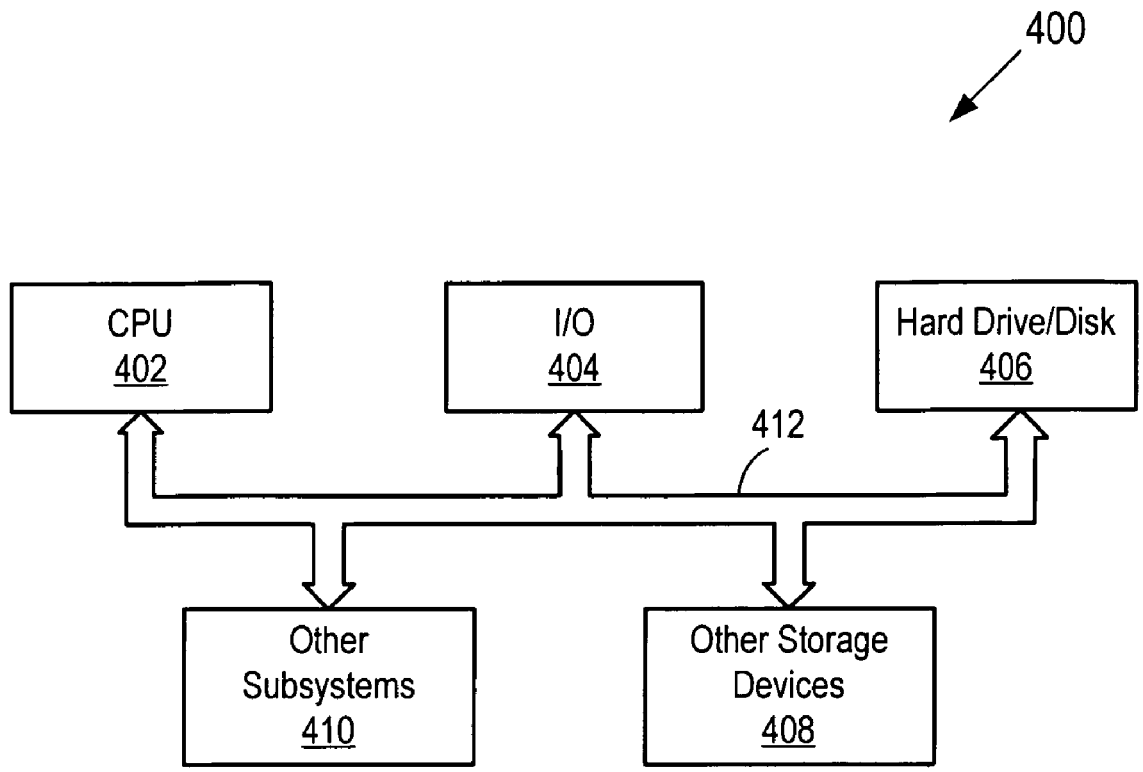
FIG. 4 is a block diagram illustration of an information handling system.

Also, the web server 104 and the database server 108 are often implemented as part of an information handling system. Referring to FIG. 4, a system block diagram of an information handling system is shown. The information handling system 400 includes a processor 402, input/output (I/O) devices, such as a display, a keyboard, a mouse, and associated controllers, collectively designed by a reference numeral 404, a hard disk and drive 406, and other storage devices, such as a floppy disk and drive and other memory devices, collectively designated by a reference numeral 408, and various other subsystems, collectively designated by a reference numeral 410, all interconnected via one or more buses, shown collectively as a bus 412.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Other Embodiments

Other embodiments are within the following claims.

What is claimed is:

1. A method for delivering a web page to a client, comprising:
   receiving a request from a client for a web page;
   generating a query from a web server to a database server, said database server comprising a plurality of data tables and a web page cache table;
   using said database server to detect execution of database triggers for updating status flags in said web page cache table;
   examining a flag in a data field in said web page cache table corresponding to said requested web page to determine if the most current version of said requested web page is stored on said web server; and
   returning the most current version of the web page to the client.

2. The method of claim 1 further comprising:
   returning the version of said web page stored on said web server to the client if the examination of said flag in said data field indicates that the version of the web page stored on said web server is the most current version of said requested web page.

3. The method of claim 1 further comprising:
   generating an updated version of said requested web page if the examination of said flag in said data field indicates that the version of the web page stored on said web server is not the most current version of said requested web page; and
   returning said updated version of said requested web page to said client.

4. The method of claim 3 further comprising:
   caching said updated version of said requested web page.

5. A system for delivering a web page to a client, comprising:
   a web server having a plurality of cached web pages stored therein, said web server being operable to receive a request from a client for a web page and to communicate with said database server to determine if a current version of said requested web page is within said plurality of cached web pages stored in said web server, said web server further being operable to transmit said requested web page to said client upon an affirmative determination that the corresponding web page stored on said web server is the current version of said requested web page;
   a database server comprising a plurality of data tables and a web page cache table, said database server being operable to examine a flag in a data field in said web page cache table corresponding to said requested web page to determine if the most current version of said requested web page is stored on said web server, wherein said database server is operable to detect the execution of a database trigger and, in response to detection of execution of said database trigger, is further operable to set said flag to a value indicating that the version of the web page stored on said web server is not the most current version of said requested web page.

6. The system of claim 5 wherein said web server is operable to transmit the version of said web page stored on said web server to the client if the examination of said flag in said data field indicates that the version of the web page stored on said web server is the most current version of said requested web page.

7. The system of claim 5 wherein said web server is operable to:
   generate an updated version of said requested web page if the examination of said flag in said data field indicates that the version of the web page stored on said web server is not the most current version of said requested web page; and
   transmit said updated version of said requested web page to said client.

8. The system of claim 7 wherein said database server is operable to update said web page cache table to set said flag to a value indicating that the version of the requested web page stored on said web server is the most current version of said requested web page.

9. An information handling system comprising a system for delivering a web page to a client, comprising:
   a plurality of data processing components operable to process data corresponding to a web page;
   wherein said information handling system is operable to communicate with:
      a web server having a plurality of cached web pages stored therein, said web server being operable to receive a request from a client for a web page and to communicate with said database server to determine if a current version of said requested web page is within said plurality of cached web pages stored in said web server, said web server further being operable to transmit said requested web page to said client upon an affirmative determination that the corresponding web page stored on said web server is the current version of said requested web page;
      a database server comprising a plurality of data tables and a web page cache table, said database server being operable to examine a flag in a data field in said web page cache table corresponding to said requested web page to determine if the most current version of said requested web page is stored on said web server, wherein said database server is operable to detect the execution of a database trigger and, in response to detection of execution of said database trigger, is further operable to set said flag to a value indicating that the version of the web page stored on said web server is not the most current version of said requested web page.

10. The system of claim 9 wherein said web server is operable to transmit the version of said web page stored on said web server to the client if the examination of said flag in said data field indicates that the version of the web page stored on said web server is the most current version of said requested web page.

11. The system of claim 9 wherein said web server is operable to:

generate an updated version of said requested web page if the examination of said flag in said data field indicates that the version of the web page stored on said web server is not the most current version of said requested web page; and transmit said updated version of said requested web page to said client.

12. The system of claim 11 wherein said database server is operable to update said web page cache table to set said flag to a value indicating that the version of the requested web page stored on said web server is the most current version of said requested web page.

* * * * *